June 12, 1956  K. JANISZEWSKI  2,749,987
DIE SET WITH A TAPERED BUSHING AND COMPLEMENTARY LEADER PIN
Filed May 1, 1953  2 Sheets-Sheet 1

INVENTOR.
KASIMIR JANISZEWSKI
BY
Wheeler, Wheeler & Wheeler
ATTORNEYS

June 12, 1956 K. JANISZEWSKI 2,749,987
DIE SET WITH A TAPERED BUSHING AND COMPLEMENTARY LEADER PIN
Filed May 1, 1953 2 Sheets-Sheet 2
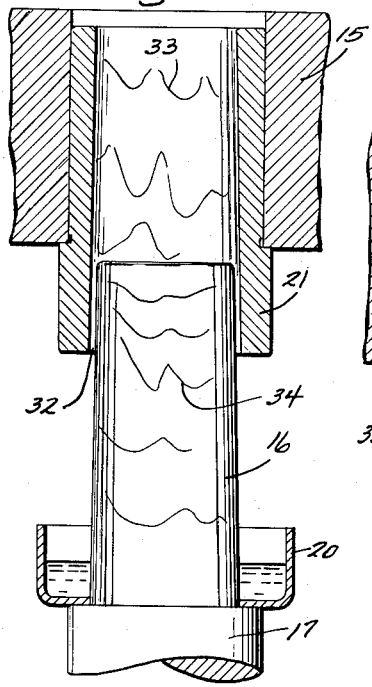
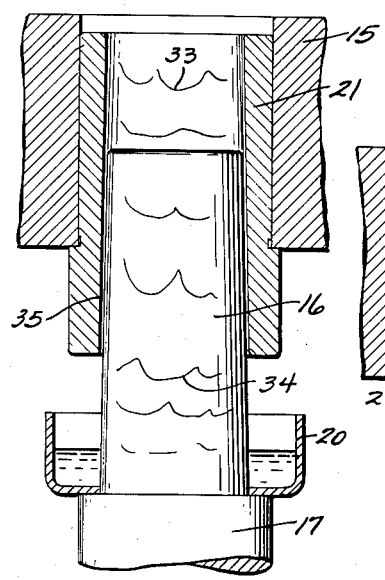
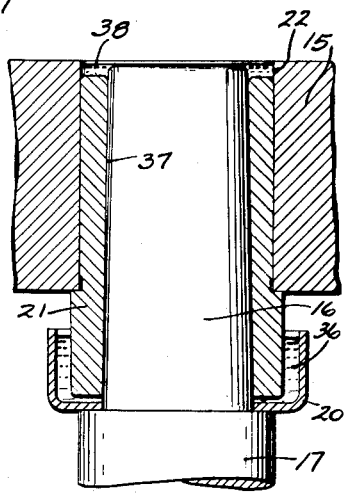
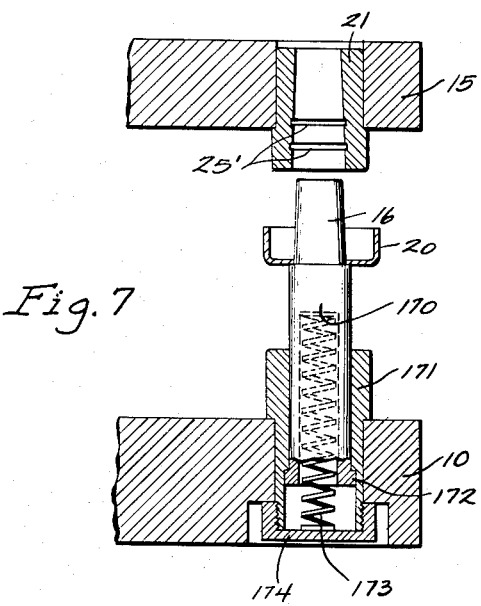
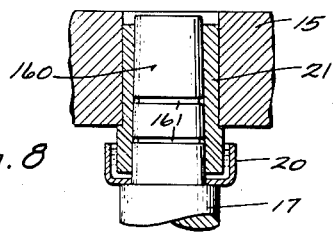
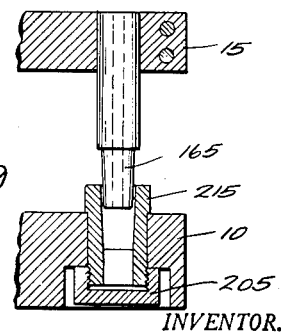
INVENTOR.
KASIMIR JANISZEWSKI
BY
Wheeler, Wheeler & Wheeler
ATTORNEYS

United States Patent Office 2,749,987
Patented June 12, 1956

2,749,987
DIE SET WITH A TAPERED BUSHING AND COMPLEMENTARY LEADER PIN
Kasimir Janiszewski, Hales Corners, Wis.
Application May 1, 1953, Serial No. 352,462
7 Claims. (Cl. 164—118)

This invention relates to a die set with a tapered bushing and complementary leader pin.

I have found important advantages in the provision of a frusto-conically tapered surface on the leader pin and a complementary surface on the bushing of a die set. In practice, the taper may amount only to .002 inch per lineal inch. With the punch holder retracted to the top of the usual stroke, there will be approximately .005 inch clearance between the pin and bushing. Thereby removal or replacement of the punch holder becomes unusually easy.

In operation, with the punch holder retracted, oil will be flowing down the bearing surfaces of the bushing and leader pin toward a cup carried by the leader pin. At approximately one inch from the bottom of the stroke, the clearance will have been reduced to no more than about .002 inch and the oil film between the pin and the bushing will become subject to compression which will increase as the downward stroke continues. Actual interaction of the punch and die will normally occur with the bushing at about one-fourth inch from the end of the stroke, at which time the leader pin clearance will be only .0005 inch and the oil will be under heavy compression, sufficiently great so that its expansion at the beginning of the upward stroke will assist in freeing the bushing from the pin. The degree of compression will be increased if special grooves or the like are employed to retain additional oil on the pin instead of permitting it to flow freely toward the oil cup.

Compression of the oil film between the bushing and the leader pin will accurately center the leader pin and the bushing to require absolute alignment between the parts without any metal to metal physical contact. The result is indefinite life and great accuracy for the die set and, in achieving these advantages, I still have unusual freedom of movement between the pin and bushing at the top of the stroke and avoid any necessity for close tolerances such as have heretofore been resorted to in unsuccessful efforts to obtain the accuracy which results from the use of the present invention. Despite the fact that the oil is heavily compressed in the operating range of the punch and die, little or no oil escapes from between the pin and bushing due to the effect of capillarity. The supply of oil between the complementary surfaces of the pin and bushing is constantly being replenished because the lower end of the bushing dips into the oil cup on each stroke and carries oil with it as it is retracted.

For special operations where additional relative movement between the punch and die is required after a blanking operation (an example being a die set in which work is formed after being blanked), I may yieldably mount either the punch or the bushing to permit the punch holder to continue its motion after the oil film is compressed as above described.

Since great accuracy of adjustment is required in order to achieve maximum oil compression at the very instant in which the punch and die interact, and since it is difficult to saw off the base of the leader pin after the pin has been hardened, I make special provision first, for adjustment for the leader pin in the die plate and, secondly, for facilitating the removal of any portion thereof which may project below the lower surface of the plate.

In this description of the nature of my invention, I have described the conventional arrangement in which the leader pin projects upwardly from the die plate and the bushing is carried in the punch holder, but it will be understood that I do not wish to limit myself to this arrangement, the inverse position of the parts being known and within the scope of the invention.

In the drawings:

Fig. 4 is a detail view in transverse section showing bushing and leader pin in relatively retracted positions.

Fig. 5 is a view similar to Fig. 4 showing bushing and leader pin in an intermediate position in their stroke.

Fig. 6 is a view similar to Fig. 4 showing bushing and leader pin fully engaged at the bottom of the stroke.

Fig. 7 is a view on a reduced scale showing a modified embodiment of the invention.

Fig. 8 is a view similar to Fig. 6 showing a modified embodiment of the invention.

Fig. 9 is a view similar to Fig. 5 showing a further modified embodiment.

Figure 1:
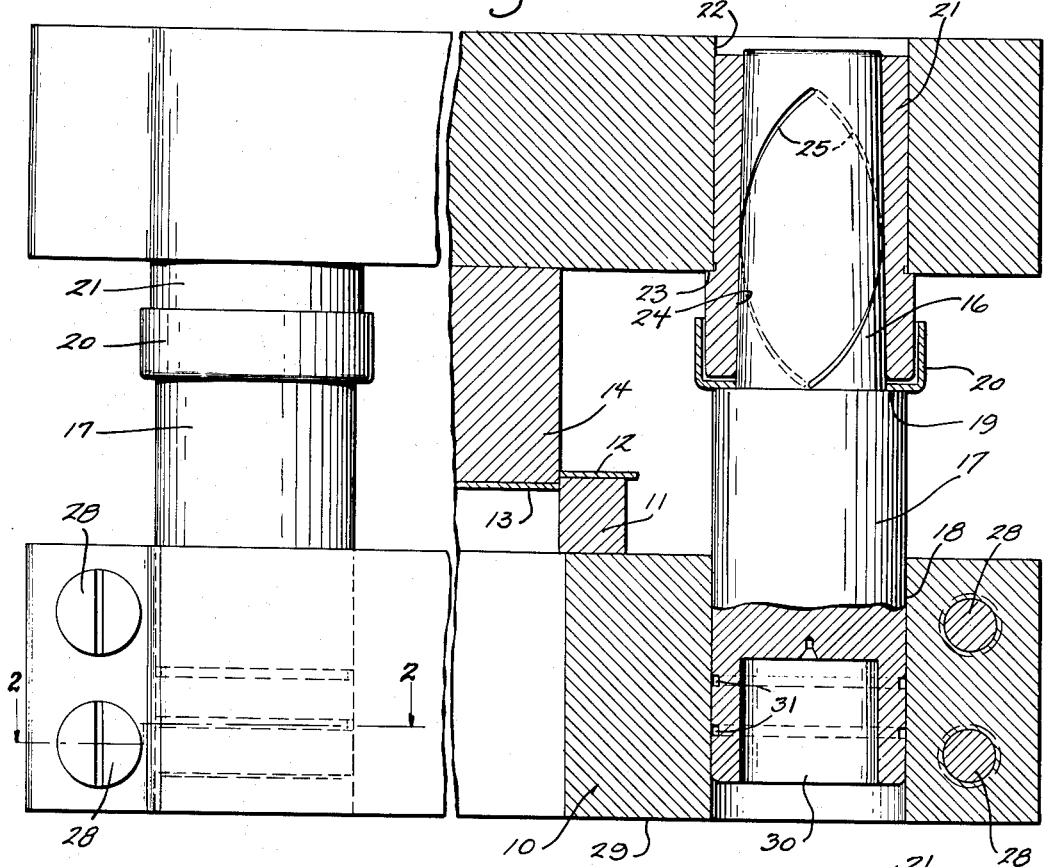
Fig. 1 is a view partially in section and partially in side elevation of a die set embodying the invention.

In the die set, a plate 10 carries any appropriate die 11 which supports the workpiece 12 from which a blank 13 has just been severed by the punch 14 mounted on the upper plate or punch holder 15 of the die set (Fig. 1).

The leader pin 16 is frusto-conically tapered and, as illustrated, is supported on a generally cylindrical base 17 of larger diameter which has a pressed fit into bore 18 of plate 10. At the top of the base portion 17 of the leader pin is the shoulder 19 upon which may rest the annular bottom of an oil cup 20 pressed over the pin 16.

The bushing 21 is pressed into the bore 22 of holder plate 15 until its shoulder 23 seats against the bottom of punch carrier 15. The inner bearing surface 24 of bushing 21 has a frusto-conical taper complementary to the external bearing surface of leader pin 16. One or both of said surfaces may be provided with any desired number of oil distributing grooves at 25 which may be helical as shown in Fig. 1. The oil reservoir cup 20 may be made to fit closely to the outside periphery of the downwardly projecting portion of bushing 23 so that as the bushing descends into the cup oil is displaced to flow upwardly through groove 25, this feature being optional and not essential in view of the fact that a mere immersion of the end of the bushing in the oil of reservoir 20 is sufficient to carry substantial quantities of oil upwardly during the retractive stroke of the punch holder 15. The bushing may have oil retaining grooves as at 25' (Fig. 7) which prevent the elevated oil from returning too rapidly.

Figure 2:
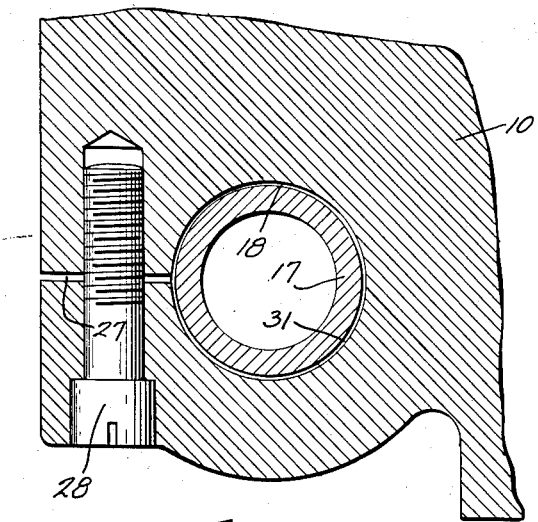
Fig. 2 is a fragmentary detail view in cross section on an enlarged scale on the line 2—2 of Fig. 1.

In the position of the parts shown in Fig. 1, there is no perceptible clearance between the complementary frusto-conically tapered surfaces of the leader pin 16 and bushing 21. It will be apparent that as parts are retracted to the position of Fig. 4, the clearance between the leader pin and the bushing will become substantial. In order to achieve substantially zero clearance and high compression of the oil film between the pin and bushing at the bottom of the stroke, it is necessary that the leader pin be accurately located in the die plate 10 with reference to the range of relative movement between the bushing and the pin in the course of the stroke between plates 10 and 15. To this end, plate 10 is desirably provided with a slot 27 opening into each of the bores 18 from the adjacent lateral margin of the plate, as shown in Fig. 2. Clamping screws 28 span slots and may be tightened to exert clamping pressure on the leader pin base when the latter is properly adjusted.

Because it is desirable to make this adjustment with reference to the actual installation of the die set, whereas it is expedient to make up leader pins and bushings in a wide variety of die sets, I prefer to construct a leader pin base in such fashion that any portion thereof which may project below the lower surface 29 of the die carrier 10 can readily be severed, even after the leader pin has been case hardened by carburizing or otherwise. To this end, I preferably bore a hole at 30 into the lower end of the leader pin base after carburizing and I also provide the base at the same time with annular grooves at 31 which desirably extend well below the normal depth of carburization and greatly reduce the amount of metal remaining between the periphery of the leader pin and the cavity 30 in the end thereof. Thereupon a pin can easily be cut off as required when the punch and die are ground and the leader pin and bushing fitted.

Figure 3:
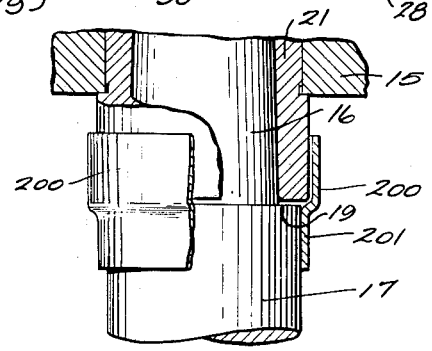
Fig. 3 is a fragmentary detail view partially in side elevation and partially in section showing a modified disposition of the oil cup.

Fig. 3 shows an alternative type of oil cup 200 having a lower portion at 201 which is sleeved onto the leader pin base instead of resting on the shoulder 19.

Fig. 7 shows the leader pin base 170 mounted in bushing 171 in the die carrier 10 and supported to the limit permitted by the head 172 under compression of a spring 173 seated in a cup 174 threaded to bushing 171. This permits leader pin to yield bodily against compression of the spring 173 after the pin and bushing have been fully engaged as above described.

Fig. 8 shows the leader pin 160 provided at 161 with annular grooves which tend to interrupt the oil flow downwardly along the surface of the pin, thereby holding an additional volume of oil to be compressed between the pin and the bushing 21. These parts are fully engaged.

Fig. 9 shows the converse of the arrangement shown in Figs. 1 to 6 and exemplifies the fact that the leader pin 165 may be mounted, if desired, on the punch carrier 15 and the bushing 215 may be mounted if desired on the die carrier 10. A cup 205 threaded to the lower end of the bushing 15 constitutes the holder and oil well in this construction.

Figs. 4, 5 and 6 show successive relative positions of the parts. In Fig. 4, the punch carrier 15 and bushing 21 are retracted substantially to the top of the stroke, leaving very substantial clearance at 32 between their complementarily tapered bearing surfaces. When the oil film is flowing downwardly in the interior of bushing 21, as indicated at 33, it is flowing downwardly over the external surface of the leader pin 16, as indicated at 34.

By the time the parts have reached the relative positions in which they are illustrated in Fig. 5, the oil film throughout the reduced clearance area 35 has been confined and distributed.

By the time the parts reach their fully engaged positions at the bottom of the stroke, as shown in Fig. 6, the lower end of the bushing is immersed in the oil bath 36 in cup 20, the clearance at 37 is negligible, the oil between the pin and bushing being highly compressed, and a small amount of oil which has been displaced has collected at 38 in the shallow well provided by bore 22 above the upper end of bushing 21.

While I do not desire to be limited to any specific clearances or degree of taper, I will repeat the example heretofore given. The leader pin and complementary surface of the bushing may have a taper of .002 inch for every inch of axial advance. In that case, the clearance 32 in Fig. 4 may be of the order of .005 inch where the parts have an average range of relative movement. In the relative position of the parts shown in Fig. 5, with the punch holder at about one inch from the bottom of its stroke, the clearance area 35 has been reduced to .002 inch and compression of the oil film has begun, thus centering the leader pin axially of the bushing.

The actual blanking operation shown in Fig. 1 will ordinarily commence at about one-fourth inch from the bottom of the stroke, at which time the clearance will have been reduced to .0005 or less. The compression of the oil film at the bottom of the stroke is so great that it acts almost like solid metal to give the effect of zero clearance between pin and bushing at this point as shown in Fig. 6.

I claim:
1. In a die set having relatively movable telescopically engaged leader pin and bushing, the combination of a pin and bushing having complementary tapering surfaces having substantial clearance at one extreme of their relative movement and negligible clearance at the other extreme of their relative movement, and means for introducing lubricant between said surfaces, said lubricant comprising resilient surface spacing means compressed as the leader pin and bushing approach the position of negligible clearance.

2. The combination set forth in claim 1 in which the complementary surfaces of the leader pin and bushing have a substantially uniform frusto-conical taper of the approximate order of .002 inch for every axial inch.

3. The device of claim 1 in which the leader pin tapers upwardly and the means for supplying lubricant comprises a cup encircling the leader pin in a position to receive the end of the bushing in the position of negligible clearance between the bushing and leader pin and to be spaced from the end of the bushing in the position of extreme clearance between the bushing and leader pin.

4. The device of claim 3 in which the leader pin has a shoulder and the cup has an annular bottom through which the leader pin projects and which is seated upon the shoulder.

5. In a die set comprising a punch carrier and a die carrier mounted for relative movement, the combination therewith of a leader pin and bushing mounted respectively on said carriers and having mutually complementary tapered surfaces telescopically related, the tapered surfaces of the pin and bushing comprising means providing maximum radial clearance between the bushing and pin in positions of maximum spacing between said carriers and minimum clearance between the bushing and pin in position of minimum spacing between said carriers at the point where the punch and die interact whereby said pin and bushing are readily separable and reengageable when in such position of maximum spacing but are closely related for accurate movement in approaching positions of minimum spacing, and means for applying a coating of oil between the said tapered surfaces in the latter said positions, said oil comprising resiliently compressible means for accurately aligning the pin and bushing without physical contact therebetween.

6. The device of claim 5 in further combination with means for adjusting the point in carrier movement at which the oil is compressed, said means comprising the pin having a cavity in its mounted end and annular grooves surrounding the cavity to facilitate removal of pin end portions between such grooves.

7. The device of claim 5 in further combination with means for adjusting the point in carrier movement at which the oil is compressed, said means comprising the carrier in which the pin is mounted having a pin-receiving bore and a slot opening laterally from the bore and clamping means spanning the slot for tightening the carrier upon a pin adjusted in said bore.

References Cited in the file of this patent

UNITED STATES PATENTS

| | | |
|---|---|---|
| 1,574,355 | Baumbach | Feb. 23, 1926 |
| 1,729,898 | Ruggles | Oct. 1, 1929 |
| 1,842,071 | Clark | Jan. 19, 1932 |
| 1,890,715 | Altvater | Dec. 13, 1932 |
| 1,926,798 | Baumbach | Sept. 12, 1933 |
| 2,320,240 | Janiszewski | May 25, 1943 |
| 2,459,053 | Tauser | Jan. 11, 1949 |
| 2,523,358 | Conner | Sept. 26, 1950 |
| 2,611,435 | Janiszewski | Sept. 23, 1952 |

FOREIGN PATENTS

| | | |
|---|---|---|
| 163,809 | Great Britain | May 26, 1921 |